United States Patent
Ehlmann

(10) Patent No.: US 10,720,878 B2
(45) Date of Patent: Jul. 21, 2020

(54) METHOD AND SYSTEM FOR COMMUNICATION BETWEEN INVERTER AND SOLAR MODULE

(71) Applicant: SunPower Corporation, San Jose, CA (US)

(72) Inventor: Jonathan Ehlmann, Austin, TX (US)

(73) Assignee: SunPower Corporation, San Jose, CA (US)

( * ) Notice: Subject to any disclaimer, the term of this patent is extended or adjusted under 35 U.S.C. 154(b) by 396 days.

(21) Appl. No.: 15/396,602

(22) Filed: Dec. 31, 2016

(65) Prior Publication Data
US 2018/0191292 A1 Jul. 5, 2018

(51) Int. Cl.
*H02S 40/32* (2014.01)
*H02S 50/00* (2014.01)
*H02J 3/38* (2006.01)

(52) U.S. Cl.
CPC .............. *H02S 40/32* (2014.12); *H02J 3/383* (2013.01); *H02S 50/00* (2013.01); *Y02B 10/14* (2013.01)

(58) Field of Classification Search
CPC .......... H02S 40/32; H02S 50/00; H02J 3/385; Y02B 10/14
See application file for complete search history.

(56) References Cited

U.S. PATENT DOCUMENTS

| | | | | |
|---|---|---|---|---|
| 8,859,884 B2* | 10/2014 | Dunton | ................. | H03K 17/691 136/251 |
| 2009/0140715 A1* | 6/2009 | Adest | ...................... | H02J 3/385 323/318 |
| 2011/0121652 A1* | 5/2011 | Sella | ................. | H01L 31/02021 307/43 |
| 2012/0087158 A1* | 4/2012 | Chapman | .............. | H02M 7/537 363/37 |
| 2012/0268970 A1* | 10/2012 | Lee | ......................... | H02M 1/32 363/21.12 |
| 2013/0016536 A1* | 1/2013 | Ehlmann | ................. | H02J 3/385 363/34 |

(Continued)

OTHER PUBLICATIONS

Ali M. Bazzi and Philip T. Krein, Concerning "MPPT for Photovoltaic optimization Using Ripple-Based Extremum seeking Control" Jun. 2011, IEEE transactions on Power Electronics, vol. 26, No. 6, pp. 1611-1612 (Year: 2011).*

(Continued)

*Primary Examiner* — Jared Fureman
*Assistant Examiner* — Michael J Warmflash
(74) *Attorney, Agent, or Firm* — Grasso PLLC

(57) ABSTRACT

Technologies for communication between an inverter and a solar module are disclosed. The disclosed technologies include monitoring a voltage and/or current of the solar module to determine a corresponding voltage waveform and/or current waveform and determining whether the voltage waveform and/or current waveform includes an encoded message. If a message is encoded in the voltage waveform and/or current waveform, the solar module may perform one or more actions. For example, the solar module may adjust an operating voltage, current, or power, adjust a switching frequency or duty cycle of one or more converters of the solar module, initiate a global maximum power point search, and/or other actions.

20 Claims, 13 Drawing Sheets

(56) References Cited

U.S. PATENT DOCUMENTS

| | | | | |
|---|---|---|---|---|
| 2013/0285457 A1* | 10/2013 | Kepley | ............... | H02J 3/385 |
| | | | | 307/77 |
| 2014/0091628 A1* | 4/2014 | Thompson | ............ | H02J 7/35 |
| | | | | 307/66 |
| 2016/0006392 A1* | 1/2016 | Hoft | .................. | H02S 50/10 |
| | | | | 361/78 |
| 2017/0104447 A1* | 4/2017 | Bintz | ............... | H04B 17/309 |
| 2017/0115119 A1* | 4/2017 | Chapman | ............ | H02S 50/00 |
| 2017/0222542 A1* | 8/2017 | Adest | .................. | H02J 3/385 |
| 2018/0191165 A1* | 7/2018 | Ehlmann | ............ | H02J 3/383 |
| 2019/0044323 A1* | 2/2019 | Deline | ............... | H02S 40/32 |

OTHER PUBLICATIONS

An M. Bazzi and Philip T. Krein, Concerning "MPPT for Photovoltaic optimization UsingRipple-Based Extremum seeking Control" Jun. 2011, IEEE transactions on Power Electronics, vol. 26, No. 6, pp. 1611-1612 ( Year: 2011) (Year: 2011).*

* cited by examiner

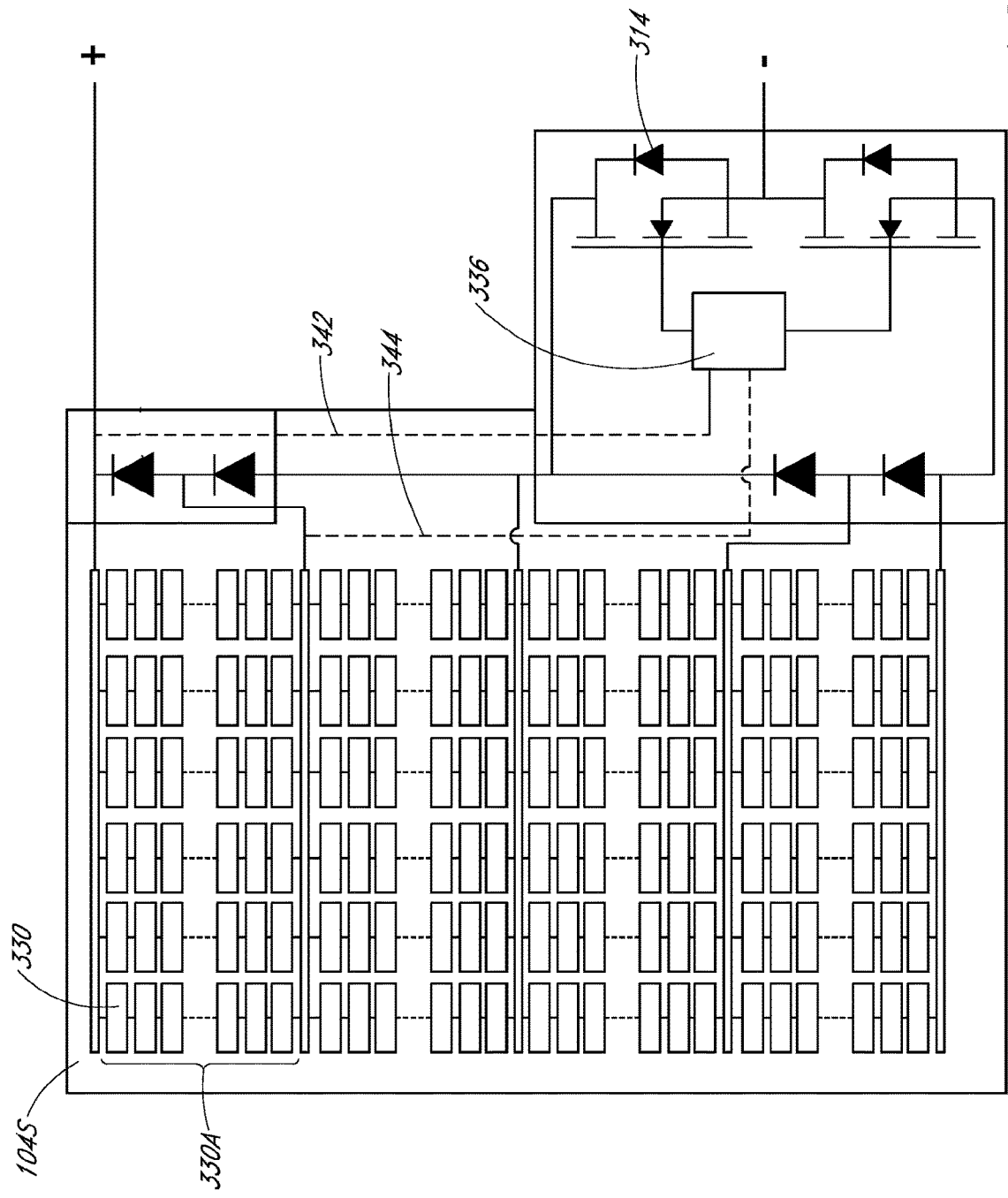

METHOD AND SYSTEM FOR COMMUNICATION BETWEEN INVERTER AND SOLAR MODULE

BACKGROUND

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

One type of a solar energy system is a solar module system. Solar modules may utilize various technologies and materials to produce energy from received sunlight. For example, one type of a solar module system is a solar photovoltaic system ("photovoltaic system"), which can employ solar panels made of silicon or other materials (e.g., III-V cells such as GaAs) to convert sunlight into electricity. Photovoltaic systems typically include a plurality of photovoltaic (PV) modules interconnected with wiring to one or more appropriate electrical components (e.g., switches, inverters, junction boxes, etc.). Another type of a solar module system is a photoelectrochemical module system, which can employ solar panels made from dye-sensitive solar cells.

A typical conventional PV module includes a PV laminate or panel having an assembly of crystalline or amorphous semiconductor devices ("PV cells") electrically interconnected and encapsulated within a weather-proof barrier. One or more electrical conductors are housed inside the PV laminate through which the solar-generated current is conducted.

Oftentimes, PV modules are mounted on the roof or other inconvenient locations of structures, such as a residential house. As such, controlling the PV module to, for example, shut down the output of the PV module or modify its operation parameters can be difficult. For example, such modifications may require physically interacting with the PV module at its mounted location, which can be precarious given its location and/or due to other factors such as the present weather.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3F is a simplified electrical schematic of at least one other embodiment of the solar module of FIG. 3A;

SUMMARY

Figure 1:
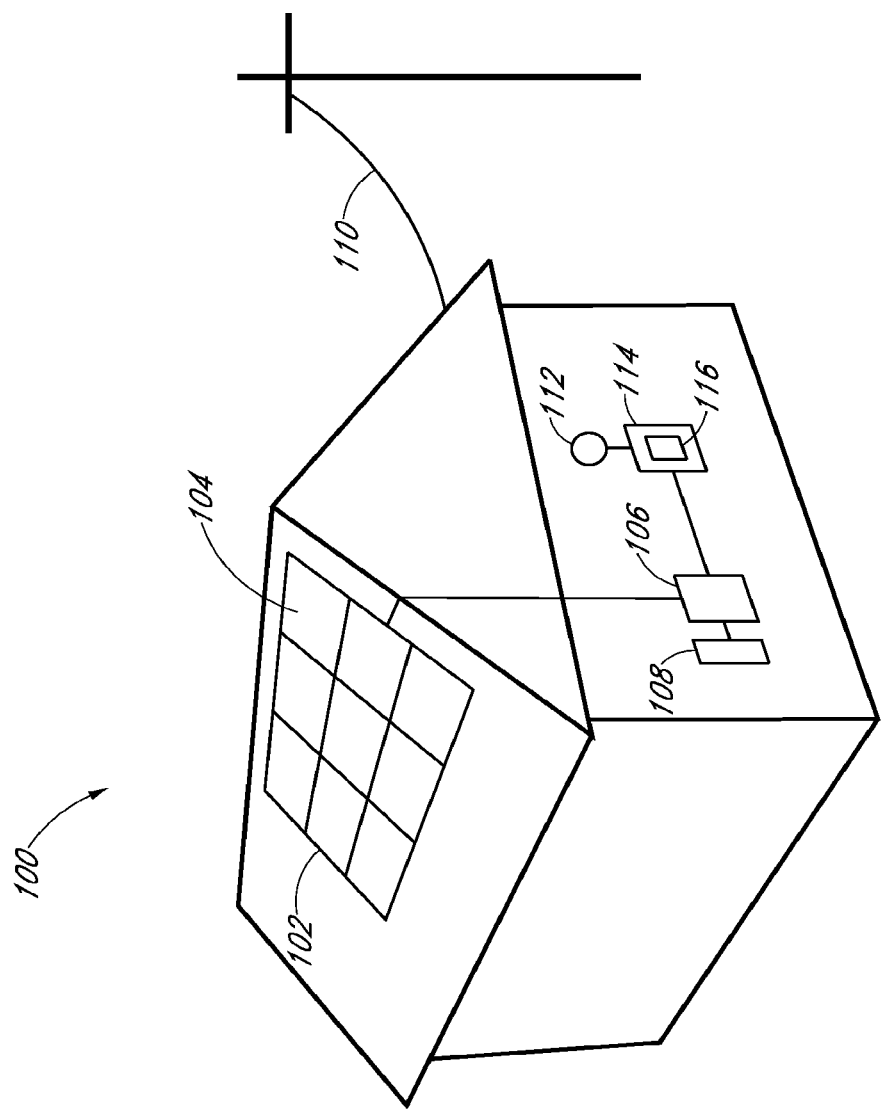
FIG. 1 is a perspective view of an at least one embodiment of electric system including a solar module system, one or more inverters, and a photovoltaic supervisor system mounted to a structure.

Embodiments may include a method for operating a solar module coupled to an inverter. The method may include supplying electrical power from the solar module to the inverter during a first time period; monitoring, during the first time period, one or more of the voltage of the solar module or the current of the solar module to determine one or more of a first voltage waveform or a first current waveform of the solar module during the first time period; determining whether a first message was encoded in the one or more of the first voltage waveform or first current waveform of the solar module; and performing one or more actions based on the determination of whether the first message was encoded.

Embodiments may also include a method for operating a solar power system having an array of solar modules and an inverter. The method may include generating electricity with the solar modules, wherein the array of solar modules has a voltage waveform and a current waveform; receiving, at the inverter, electricity generated by the array of solar modules during a first time period; and controlling with the inverter one or more of the voltage waveform or current waveform of the solar modules during the first time period, wherein controlling one or more of the voltage waveform or current waveform of the solar modules includes encoding a first message on to one or more of the voltage waveform or the current waveform.

Embodiments may further include an apparatus that includes a solar module adapted to couple to an inverter and supply electrical power to said inverter at a module voltage and module current. The solar module may include a plurality of solar cells adapted to generate electrical power upon exposure to light; a sensor adapted to determine one or more of the module voltage and the module current; a controlled switch adapted to disconnect the solar module from the inverter upon receiving a disconnect command and connect the solar module to the inverter upon receiving a connect command. The apparatus may also include a module controller adapted to monitor, with the sensor, one or more of the module voltage or the module current when the solar module is supplying electrical power to said inverter to determine one or more of a first voltage waveform or first current waveform of the solar module during the first time period; determine whether a first message was encoded in the one or more of a first voltage waveform or first current waveform of the solar module; and issue one or more of a disconnect command or a connect command to the controlled switch based on the determination of whether the first message was encoded.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising."—This term is open-ended. As used in the appended claims, this term does not foreclose additional structure or steps.

"Configured To."—Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. —As used herein, these terms are used as labels for nouns that they precede, and do not imply any type of ordering (e.g., spatial, temporal, logical, etc.). For example, reference to a "first" solar module does not necessarily imply that this solar module is the first solar module in a sequence; instead the term "first" is used to differentiate this solar module from another solar module (e.g., a "second" solar module).

"Based On."—As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

FIG. 1 is a diagram of an example electric system 100. The electric system 100 includes a solar module system 102 including one or more photovoltaic solar modules 104, one or more inverters 106 coupled to the solar module system 102, and a photovoltaic supervisor system 108. The electric system 100 also includes a connection 110 to a utility grid, an electric meter 112 for the connection 108 to the utility grid, and an electric panel 114 for the electric system 100.

When the sun is shining on the solar module system 102, the solar module system 102 produces direct current (DC) electric power and provides the DC power to the inverters 106. In response, the inverters 106 produce alternating current (AC) power for consumption by loads on the electric system 100 or for providing to the connection 108 to the utility grid. The inverters 106 may be a single string inverter receiving power from all of the solar modules 104 in the solar module system 102, a plurality of inverters working together to receive and convert the electricity generated by the solar module system 102, or a plurality of inverters 106 each receiving the electricity generated by a subset of the solar module system 102 (e.g., an inverter 106 for each branch circuit of the solar module system 102). When the loads on the electric system 100 consume more power than is provided by the solar module system 102, the loads draw power from the connection 108 to the utility grid. When loads consume less power than is provided by the solar module system 102, the solar module system 102 can provide the excess power to the connection 108 to the utility grid. Although FIG. 1 illustrates a grid-tied electric system 100, the systems and methods described in this specification can be applied in various other types of electric systems.

The photovoltaic supervisor system 108 is a computing system configured, by virtue of appropriate programming, to monitor the solar module system 102 and perform one or more actions based on monitoring the solar module system 102. For example, the photovoltaic supervisor system 108 can be configured for interfacing with net and sub meters, inverters, and other optional components of the system. In some examples, the photovoltaic supervisor system 108 measures power output by the solar module system 102 and transmits measurements to a remote system, e.g., a homeowner's computer system, a building manager's computer system, or a solar module manufacturer or installer computer system. In some examples, the photovoltaic supervisor system 106 does not directly monitor the solar module system 102; instead, the photovoltaic supervisor system 108 can monitor or meter the inverters coupled to the solar module system 102. The photovoltaic supervisor system 108 can be enclosed in a weatherproof housing for outdoor installation.

Additionally, the electric system 100 may include a rapid shutdown control 116, which may be coupled to one or more of the electrical panel 114 (as shown in FIG. 1), inverters 106, and/or photovoltaic supervisor system 108. The rapid shutdown control 116 may be a button, switch, toggle, etc. that a user (e.g., first responder, homeowner, technician, etc.) can activate to deactivate the solar module system 102 as discussed herein. Additionally or alternatively, the rapid shutdown control 116 may be implemented in software running on the electrical panel 114, inverters 106, and/or photovoltaic supervisor system 108 that receives a command from a user electronically (e.g., over the Internet, over a wireless and/or wired connection, over a direct wireless connection, over a direct wired connection). The rapid shutdown control 116 may be built to be compliant with NEC 2017 690.12 as discussed herein.

As discussed herein, activating the rapid shutdown control 116 may cause the solar module system 102 to deactivate itself using one-way communication from the inverters 106 to the solar module system 102 (and its solar modules 104). It will be understood that the inverters 106 may be used to control the voltage and/or current of the solar module system 102. Because the inverter 106 controls the voltage and/or current of the solar module system 102 by adjusting the operating parameters of the inverter (as discussed herein), the inverter 106 may modulate a signal on to the adjustment of the operating parameters during a time period. The solar modules 104 may receive and decode such a message by monitoring the voltage and current of the solar module 104 during the time period. Under NEC 2017 690.12, in order for the solar module system 102 to be enabled, the solar module system 102 must receive a "keep alive" signal. Further, under NEC 2017 690.12, if the solar module system 104 does not receive the "keep alive" signal, the solar module system 102 must shut down automatically. Accordingly, the inverters 106 may modulate the "keep alive" signal on the voltage and/or current waveforms of the solar module system 102 as part of controlling the voltage and/or current of the solar module system 102 (discussed in further detail herein). Each active solar module 104 of the solar module system 102 may decode the "keep alive" signal from the voltage and/or current waveform of the solar module 104 and continue to supply electrical power to the inverters 106. If, however, the solar module 104 does not detect the "keep alive" signal, the solar module 104 must disconnect itself automatically and cease to supply electrical power to the inverters 106 (discussed in further detail herein). Alternatively or additionally, the solar module 104 may detect a "disconnect" signal and disconnect itself automatically and cease to supply electrical power to the inverters 106. Further, the solar module 104 may detect other messages encoded on the voltage and/or current waveform of the solar module 104 as discussed herein.

Figure 2:
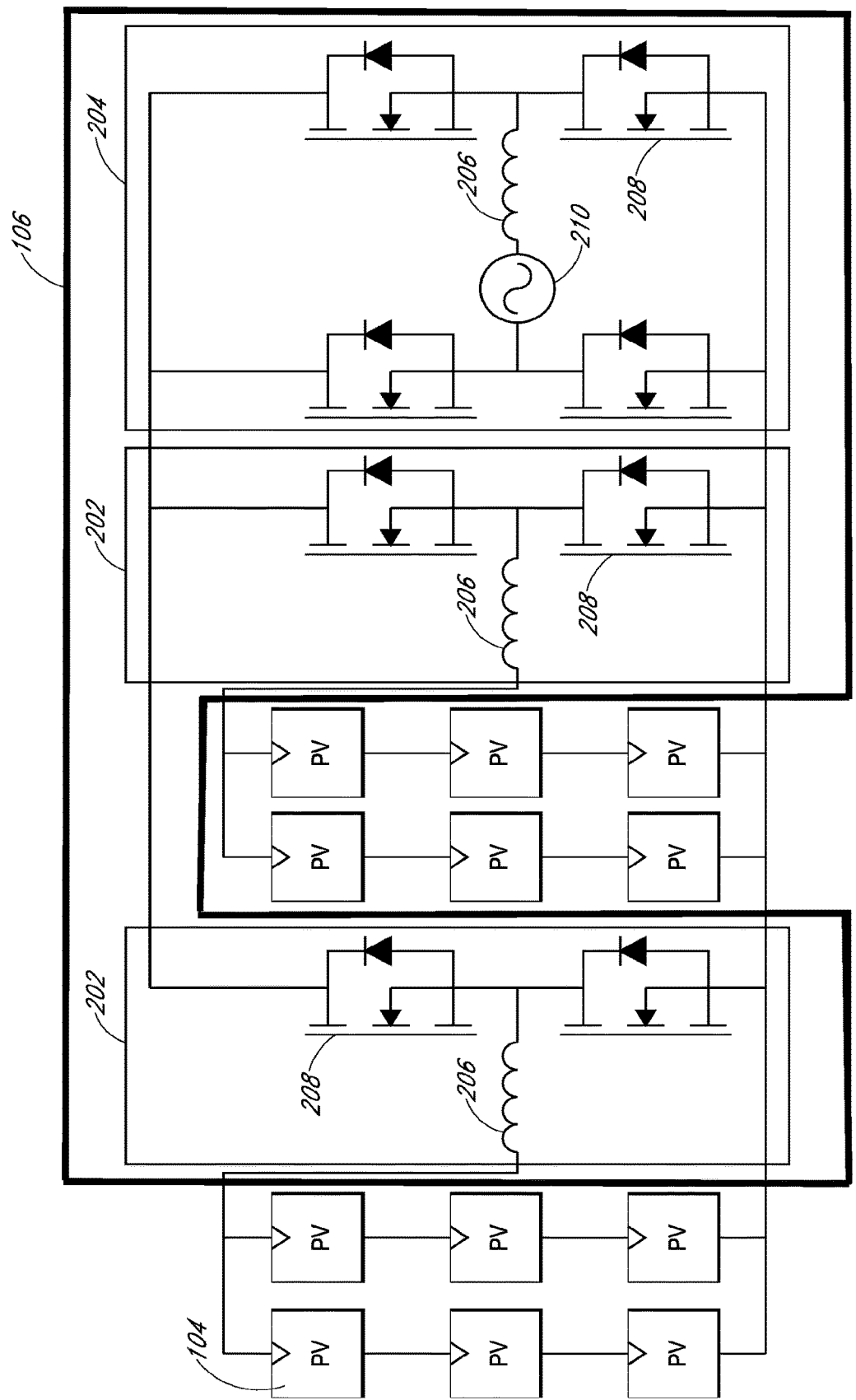
FIG. 2 is a simplified electrical schematic of at least one embodiment of a solar module and inverter of the electric system of FIG. 1.

FIG. 2 is a simplified electrical schematic showing a plurality of solar modules 104 coupled to an inverter 106. The inverter 106 shown in FIG. 2 is a simplified two-stage DC-AC inverter comprising a pair of half-bridge boost circuits 202 and a full-bridge DC-AC inverter circuit 204. The boot circuits 202 may receive electrical power from a number of solar modules 104 connected in series and/or parallel (two parallel strings of three series-connected solar modules are coupled to each DC-DC converter 202 in FIG. 2, but it will understood that any other arrangement of solar modules 104 may be used), and convert the power from the solar modules 104 into a higher voltage DC signal using an energy storage device such as an inductor 206 and a pair of controlled switches 208. The controlled switches 208 may be controlled using known techniques to enable the DC-DC converter 202 to output higher DC voltage than it receives from the solar modules 104. The DC-AC inverter 204 also includes an inductor 206 and a plurality of controlled switches 208. The controlled switches 208 may be controlled using known techniques to receive DC voltage and output AC power 210 at a desired voltage and frequency (e.g., output to the electrical panel 114).

Figure 3A:
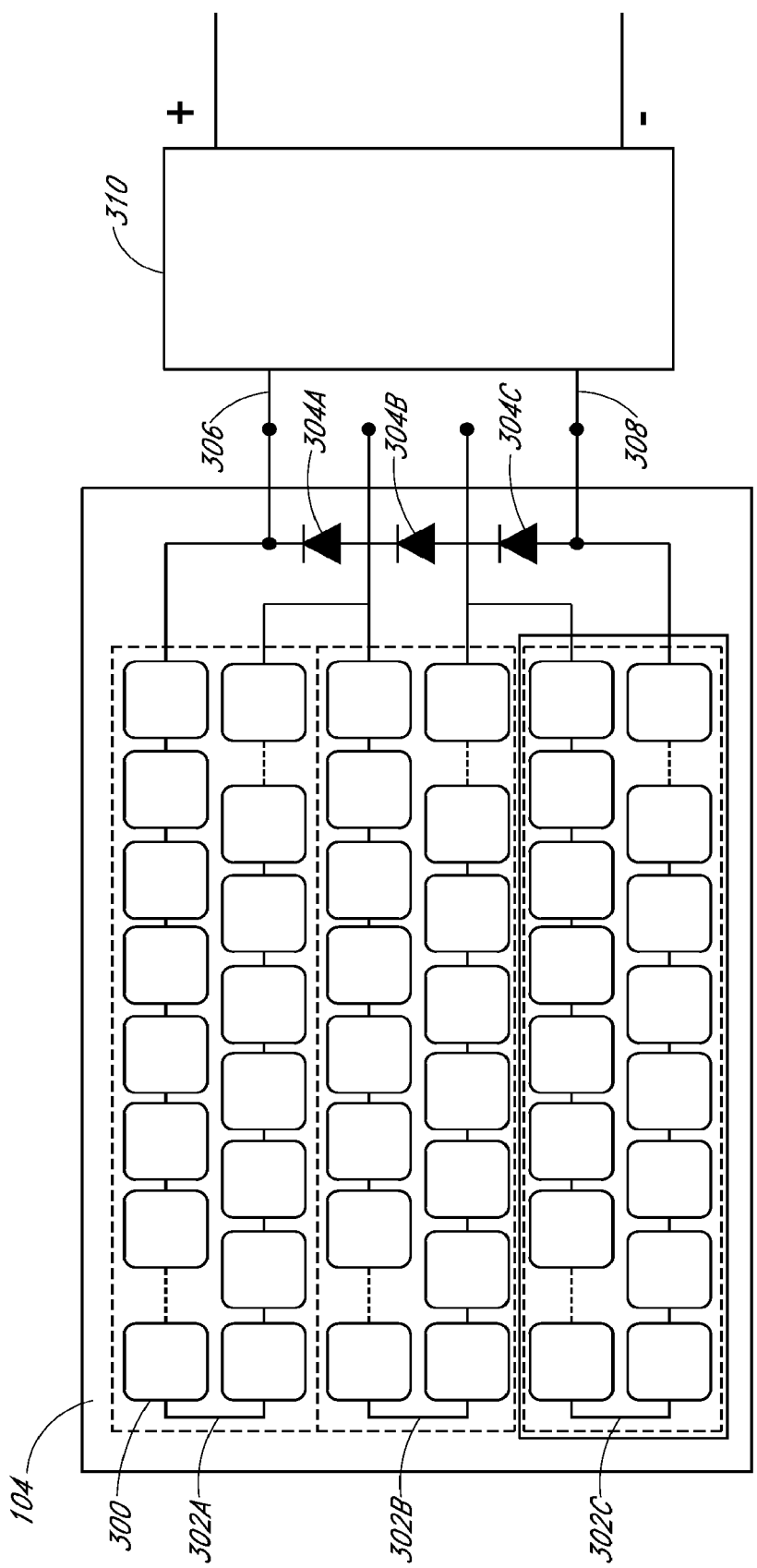
FIG. 3A is a simplified electrical schematic of at least one embodiment of a solar module of the electric system of FIG. 1.

FIG. 3A is a simplified electrical schematic of a solar module 104. The solar module 104 may include an energy generation portion 300 including a plurality of series-connected solar cells arranged in one or more strings. The solar cells (also referred to herein as PV cells) may be made of silicon or other materials (e.g., III-V cells such as GaAs) and are configured to convert sunlight into electricity. The solar cells may be front-contact solar cells or interdigitated back-contact solar cells. The one or more strings may be coupled to bypass diodes 304 at various points along the string to enable current to bypass a substring of the energy generation portion 300 if the substring becomes reverse biased due to shading, damage, or malfunction of the solar cells. As a non-limiting example, the string of solar cells of the energy generation portion 304 shown in FIG. 3A is divided into three sub-strings 302A, 302B, and 302C, each with its own respective bypass diode 304A, 304B, and 304C that may be used to bypass its respective sub-string if the sub-string becomes reverse biased due to shading, damage, or malfunction of some of the solar cells. It will be understood that more or fewer sub-strings may be included, and each may have a bypass diode 304. The bypass diodes 304 may be housed inside a junction box. The energy generation portion 300 also includes a first terminal 306 and a second terminal 308. The energy generation portion 300 may be coupled to a module level power electronic device (MLPE) 310 by the terminals 306 and 308. The MLPE 310 may receive and decode messages sent from the inverter 106 as discussed herein.

Figure 3B:
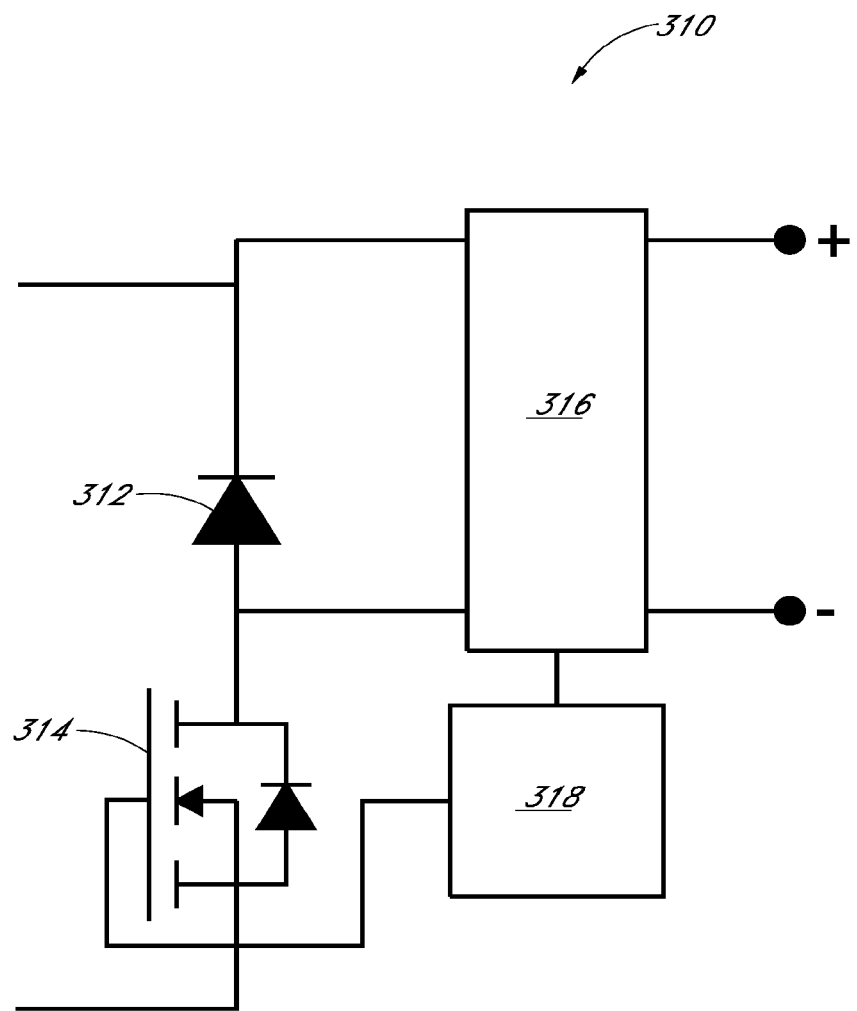
FIG. 3B is a simplified electrical schematic of at least one embodiment of a module level power electric device of the solar module of FIG. 3A.

FIG. 3B is a simplified electrical schematic of the components of the MLPE 310 of FIG. 3A. The MLPE 310 may include a diode 312, a controlled switch 314, a sensor 316, and a controller 318. The diode 312 may be used to bypass the solar module 104 in case the entire solar module 104 becomes reverse biased due to shading, damage, or malfunction. The controlled switch 314 may be used to disconnect the solar module 104 from the rest of the electric system 100 or duty cycle the solar module 104 based on communications with the inverter 106 as discussed herein. The sensor 316 may be used to determine one or more of a power output of the solar module 104, a current output of the solar module 104, and/or a voltage across the solar module 104. The sensor 316 may be coupled to the controller 318, which may decode messages from the inverter 106 as discussed herein using the power, current, and/or voltage measurements taken by the sensor 316. In response to receiving (or not receiving) communications from the inverter 106, the controller 318 may control the controlled switch 314 to disconnect the solar module 104 from the rest of the electric system 100 or duty cycle the solar module 104. Additionally, the controller 318 may adjust the operating voltage of the solar module 104, adjust the operating current of the solar module 104, adjust the operating power of the solar module 104, or initiate a global maximum power point search for the solar module 104. Further, the controller 318 may also send a command to the DC-DC converter 202, adjust a converter switching frequency of a DC-DC converter 202, and/or adjust a converter duty cycle of the DC-DC converter 202.

Figure 3C:
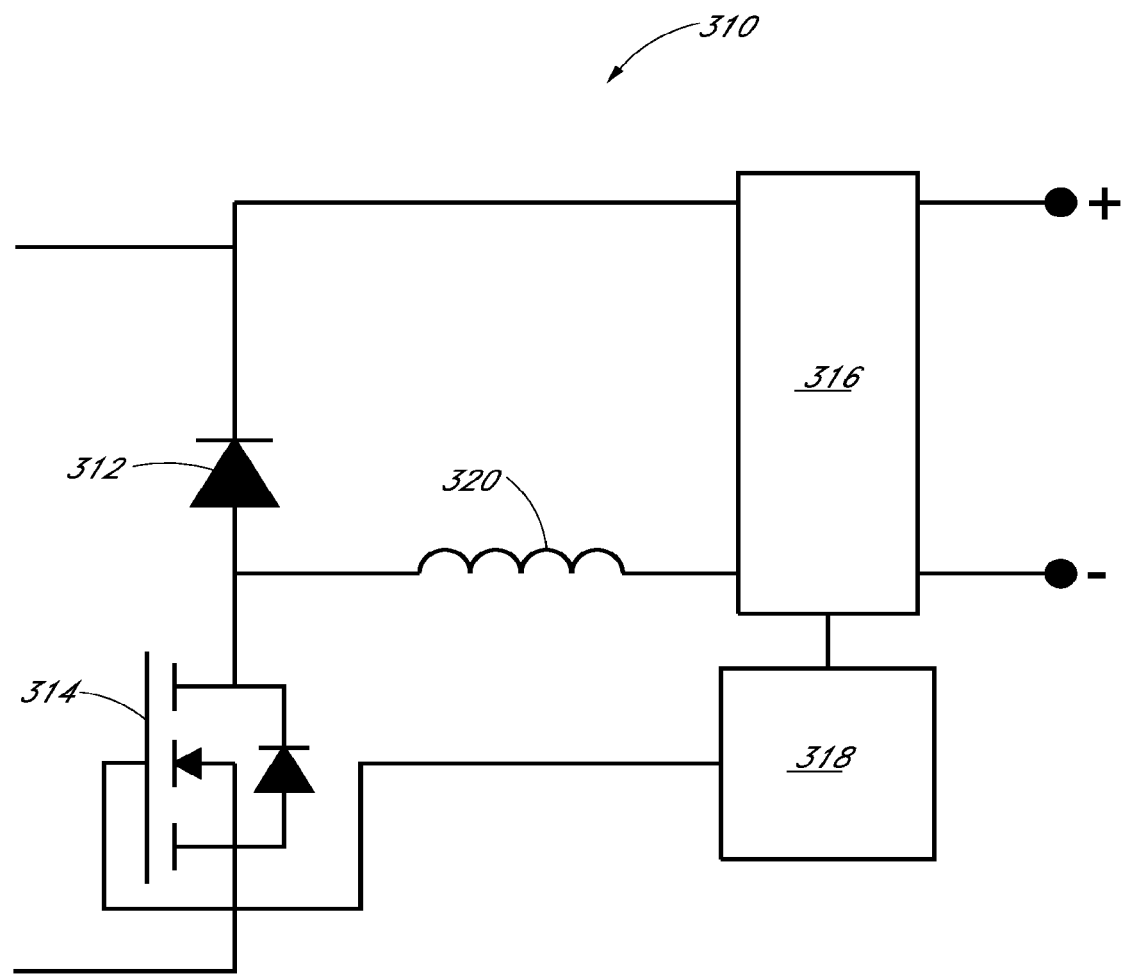
FIG. 3C is a simplified electrical schematic of at least one other embodiment of the module level power electric device of the solar module of FIG. 3A.

FIG. 3C is an alternative simplified electrical schematic of the components of the MLPE 310 of FIG. 3A. The MLPE 310 of FIG. 3C includes the same components as the MLPE 310 of FIG. 3B with the addition of an inductor 320. With the addition of the inductor 320, the MLPE 310 of FIG. 3C has the additional capability of being a buck converter which may be used to optimize the DC voltage (i.e., by stepping down the DC voltage) received from the energy generation portion 300. In response to receiving (or not receiving) communications from the inverter 106, the controller 318 may control the controlled switch 314 to disconnect the solar module 104 from the rest of the electric system 100 or duty cycle the solar module 104. Additionally, the controller 318 may adjust the operating voltage of the solar module 104, adjust the operating current of the solar module 104, adjust the operating power of the solar module 104, or initiate a global maximum power point search for the solar module 104. Further, the controller 318 may also send a command to the DC-DC converter 202, adjust a converter switching frequency of a DC-DC converter 202, and/or adjust a converter duty cycle of the DC-DC converter 202.

Figure 3D:
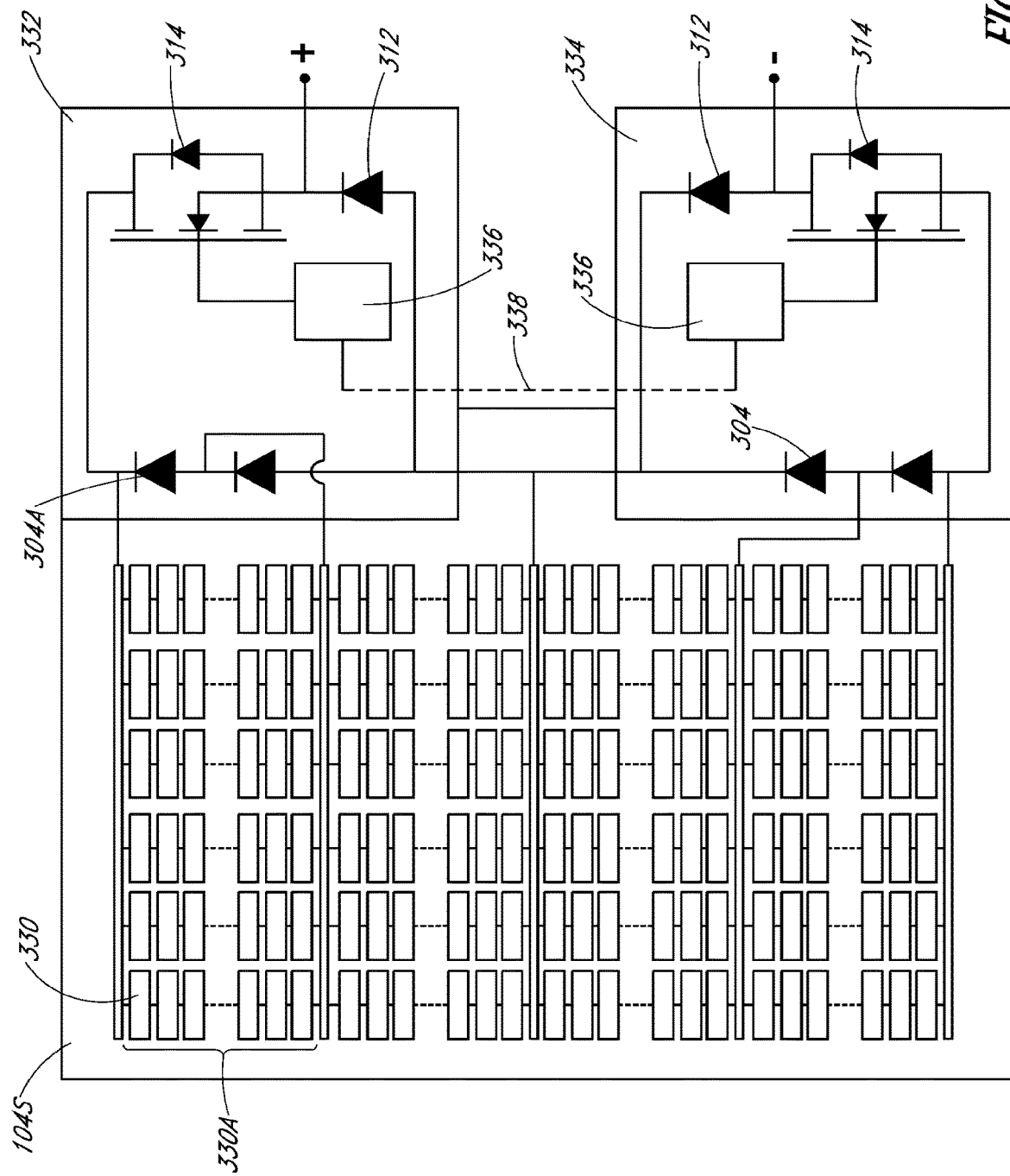
FIG. 3D is a simplified electrical schematic of at least one other embodiment of the solar module of FIG. 3A.
Figure 3E:
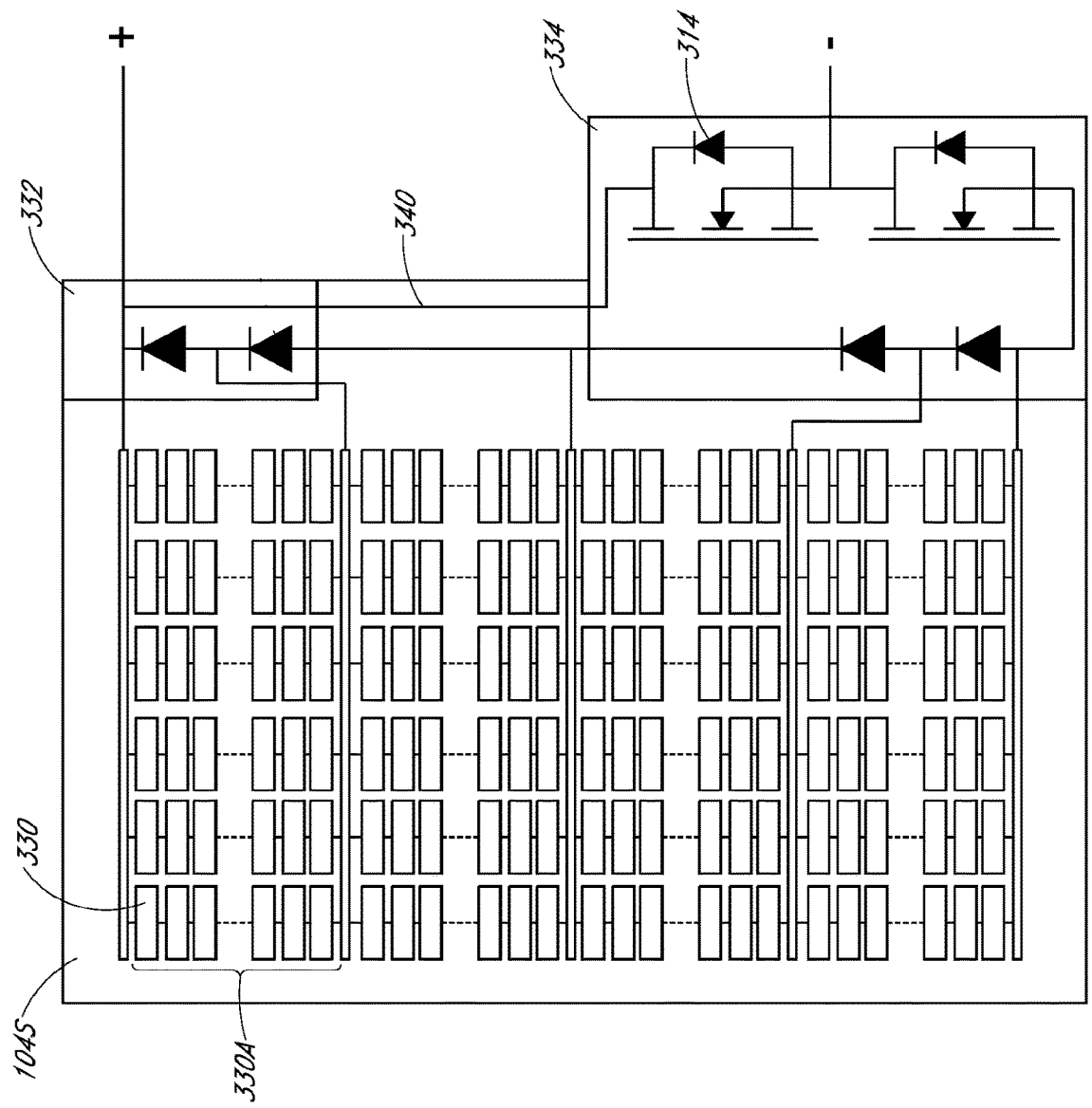
FIG. 3E is a simplified electrical schematic of at least one other embodiment of the solar module of FIG. 3A.

FIGS. 3D-3F are simplified electrical schematics of an alternative solar module 104S with MLPEs contained in one or two junction boxes 332 and 334. The solar module 104S of FIGS. 3D-3F may include many of the same components as the solar module 104 of FIG. 3A, but the energy generation portion of the solar module 104S comprises multiple strings of solar cells arranged in shingled super cells 330. In each super cell 330 of solar cells, adjacent solar cells are conductively bonded to each other in the region in which they overlap by an electrically conducting bonding material that electrically connects the front surface metallization pattern of one solar cell to the rear surface metallization pattern of the adjacent solar cell. Suitable electrically conducting bonding materials may include, for example, electrically conducting adhesives and electrically conducting adhesive films and adhesive tapes, and conventional solders. Preferably, the electrically conducting bonding material provides mechanical compliance in the bond between the adjacent solar cells that accommodates stress arising from mismatch between the coefficient of thermal expansion (CTE) of the electrically conducting bonding material and that of the solar cells (e.g., the CTE of silicon). To provide such mechanical compliance, in some variations the electrically conducting bonding material is selected to have a glass transition temperature of less than or equal to about 0° C. To further reduce and accommodate stress parallel to the overlapping edges of the solar cells arising from CTE mismatch, the electrically conductive bonding material may optionally be applied only at discrete locations along the overlapping regions of the solar cells rather than in a continuous line extending substantially the length of the edges of the solar cells. Each super cell 330 (six are shown in FIGS. 3D-3F) is connected in electrical parallel with the other super cells 330 of the energy generation portion.

The solar module 104S may also include a number of bypass diodes 304 and controllers 336. At several points in each super cell 330 (e.g., every 25 solar cells, every 30 solar cells, etc.) a controller 336 may couple the super cell 330 to a bypass diode 304. If a portion of the super cell 330 becomes reverse biased due to shading, damage, or malfunction of some of the solar cells, electricity may bypass the reverse biased portion of the super cell 330 and flow through the bypass diode 304 connected in parallel with that portion of the super cell 300. For example, a portion 330A of the super cell 330 may be bypassed by the bypass diode 304A.

The solar module 104S may include two junction boxes: a positive junction box 332 at the positive terminal of the solar module 104S and a negative junction box 334 at the negative terminal of the solar module 104S. As shown in FIGS. 3D-3F, in addition to housing the bypass diodes 304, an MLPE 310 (see FIGS. 3B, 3C) may be housed in one or both of the junction boxes 332 and 334. As discussed above, each MLPE 310 may include a diode 312 and a controlled switch 314. It should be appreciated that the diode 312 may be embodied as a MOSFET in other embodiments. The controller 336 of each junction box 332, 334 may make or receive measurements of the voltage across the positive and negative terminals of the solar module 104S or measurements of the current flowing through the solar module 104S and decode messages from the voltage and/or current waveforms. The controller 336 may operate the controlled switches 314 to which it is coupled in response to the messages received (or the lack of a message) as discussed herein.

Each solar module 104S in FIGS. 3D-3F, may be slightly different, however. For example, the solar module 104S of FIG. 3D includes MLPEs 310 housed in both the positive junction box 332 and the negative junction box 334. The MLPEs 310 each include a controller 336 which may be coupled together by a line 338. The line 338 may be used to facilitate communications between the two controllers 318. The line 338 may be disposed within a laminate of the solar module 104S.

It should be appreciated that the junction boxes 332, 334, via the controllers 336, may each bypass half of the solar module 104S if needed. Such functionality allows for rapid shutdown and active open-circuit bypass. In some embodiments, each of the junction boxes 332, 334 may include circuitry to "optimize" each corresponding half of the solar module 104S. Depending on the type of optimization desired, the junction boxes 332, 334 may include additional circuitry (e.g., an inductor to create a buck converter, an inductor-inductor-capacitor circuit, a single-ended primary-inductor converter (SEPIC), or other components).

It should be further appreciated that, in some embodiments, only one of the controllers 336 need receive the "keep alive" signal. In such embodiments, the controller 336 receiving the "keep alive" signal may communicate the signal to the other controller 336 via the line 338. In other embodiments, the controllers 336 may operate independently of each other and, in such embodiments, the line 338 may not be included.

Referring now to FIG. 3E, the solar module 104S of FIG. 3E includes an MLPE 310 disposed within the negative junction box 334. The MLPE 310 of FIG. 3E includes two controlled switches 314 coupled to the negative terminal of the solar module 104S. The top controlled switch 314 is also coupled to the positive terminal of the solar module 104S. The controller 318 may bypass the solar module 104S (i.e., preventing power that is generated by the solar module 104S from being sent to the inverter 106) by opening the bottom controlled switch 314 and closing the top controlled switch 314, thereby causing all of the current flowing from the negative terminal of the solar module 104S to the positive terminal 104S to flow along the bypass line 340 coupling the two junction boxes 332 and 334 together. The bypass line 340 may be disposed within the laminate or outside of it.

Referring now to FIG. 3F, the solar module 104S of FIG. 3F also includes an MLPE 310 disposed within the negative junction box 334. However, unlike the solar module 104S of FIG. 3E, the solar module 104S of FIG. 3F does not include a bypass line 340. Instead, the solar module 104S of FIG. 3F includes lines 342 and 344, which may couple the controller 336 to the super cells 330 at additional locations (e.g., such as in parallel to the portion 330A of the super cell 330 as shown in FIG. 3F) to receive additional measurements of the voltage and/or current of the solar module 104S. It should be appreciated that the controller 336 of the FIG. 3F cannot bypass or disconnect the entire solar module 104S. Rather, the controller 336 may limit the output voltage of the solar module 104S by bypassing portions of the solar module 104S based on the additional voltage/current measurements received from the solar module 104S as discussed above.

Figure 4:
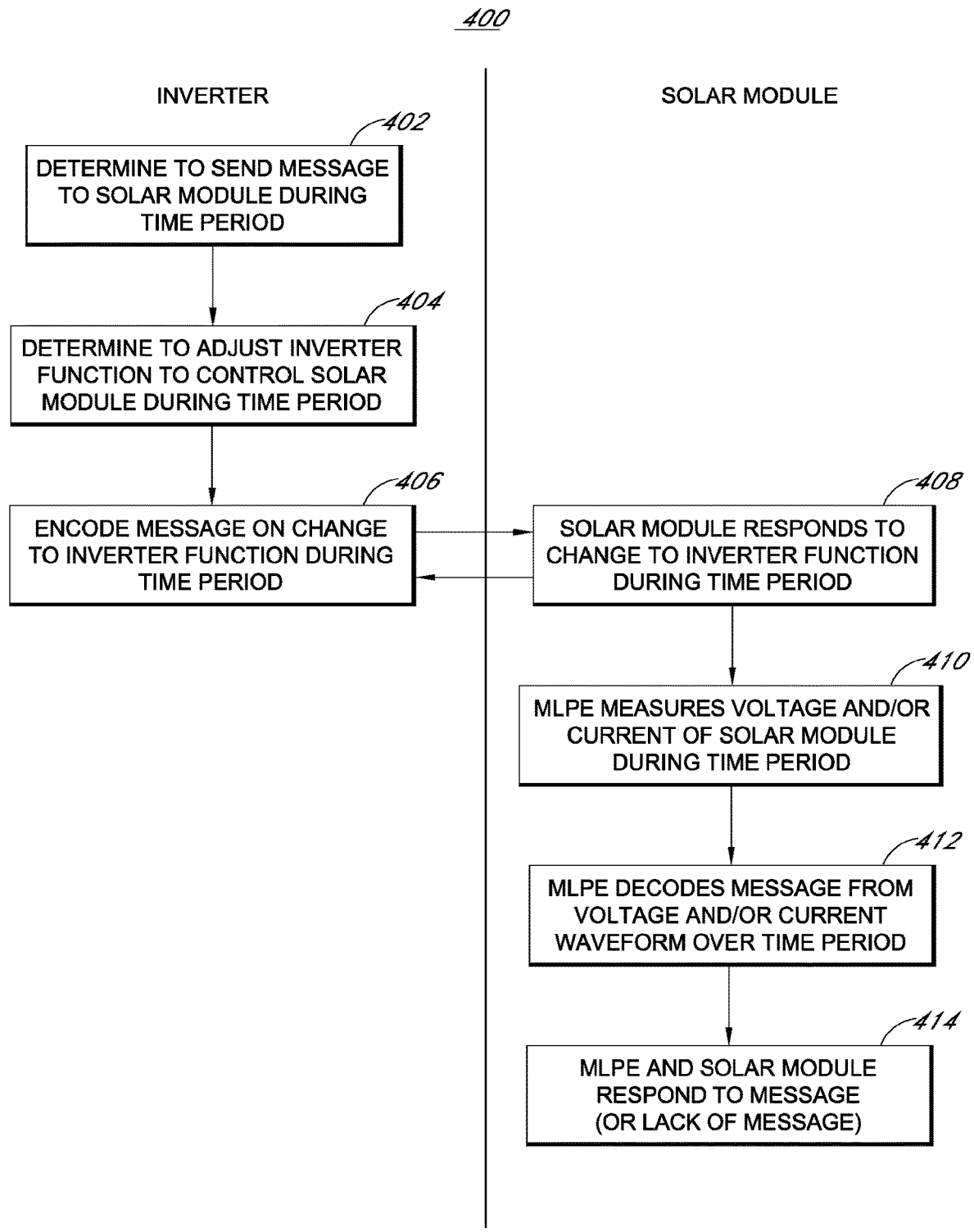
FIG. 4 is a simplified flow chart of at least one embodiment of a signal processing method that may be performed by an inverter and corresponding module level power electric device.

FIG. 4 is a block diagram showing a signal processing method 400 performed by inverter 106 to encode a message onto the function of the inverter 106 and by the MLPE 310 of a solar module 104 to decode the message. At method block 402, the inverter 106 determines to send a message to the solar module(s) 104 during a time period. The message may be embodied as the "keep alive" message discussed herein, which may be sent as a broadcast message to every solar module or as a unicast message to a single solar module or an identified group of solar modules. Of course, in other embodiments, the message may be sent as a broadcast message to every solar module, or a group of solar modules, with a specific message intended for a particular solar module or sub-group of solar modules (e.g., a broadcast message that instructs all solar modules to stay operational, while also including information or a command for a specific solar module or sub-group of solar modules.) If the message is a unicast message, it will be understood that the solar modules 104 must each have a unique address (e.g., a MAC address) in the electric system 100 such that each solar module may be addressed individually. The message may be a "keep alive" message that, when received by and decoded by the MLPE 310, will result in the MLPE 310 continuing to allow the solar module 104 to supply power to the inverter 106, or the message may be a "disconnect" message that, when received by and decoded by the MLPE 310, will result in the MLPE 310 disconnecting the solar module 104 (e.g., by opening the controlled switch 314) from the inverter 106.

In addition to a "keep alive" message or a "disconnect" message, messages may also be sent to adjust the function of the solar module 104 in other ways. As non-limiting example, the message may be a message providing instructions for the MLPE 310 to do one of the following: adjust the operating voltage of the solar module, adjust the operating current of the solar module, adjust the operating power of the solar module, adjust a converter switching frequency of a DC-DC converter of the solar module, adjust a converter duty cycle of the DC-DC converter of the solar module, initiate a global maximum power point search for the solar module. It will be understood that other types of messages (or combinations) may be sent using the techniques discussed herein.

At method block 404, the inverter 106 may determine to adjust certain inverter functions to control the solar module 104 during the time period. For example, the inverter 106 may implement a maximum power point tracking (MPPT) technique such as ripple correlation control technique (RCC) to ensure that the solar module system 102 and/or the individual solar modules 104 is generating as much power as practicable (discussed in more detail in connection with FIG. 5A). Additionally or alternatively, the inverter 106 may control the switching frequency of some of the controlled switches 208 (e.g., the pair of controlled switches 208 in the DC-DC converters 202) (discussed in more detail in connection with FIG. 5B).

At method block 406, the inverter 106 may encode the message on to the change in inverter function during the time period. For example, the inverter 106 may employ any of a number of known modulation schemes such as frequency shift keying (FSK), phase shift keying (PSK), quadrature amplitude modulation (QAM), etc. The message may be encoded in such a way to have error protection to prevent false receptions of the message. At method block 408, the one or more solar modules 104 coupled to the inverter 106 may respond to the change in inverter function during the time period. For example, if the change in inverter function is an adjustment to the voltage and/or current across the solar module system 102 including the solar module 104, the voltage and/or current of the solar module 104 will respond by likewise being adjusted. For example, if the inverter 106 is implementing MPPT with an RCC technique, the inverter 106 may be adjusting itself to control the magnitude of the voltage, power, and/or current of the solar module 104. Additionally or alternatively, the inverter 106 may adjust the switching frequency of some of its controlled switches 208, which may result in the frequency of the voltage and/or current of the solar module 104 changing accordingly. It may be advantageous for the inverter 106 to monitor the voltage and/or current of the solar module 104 during the time period and make adjustments accordingly. It will be understood, however, the inverter 106 may be able to control the voltage and/or current of the solar module 104 while also encoding a message on the control signal as discussed herein.

At method block 410, the MLPE 310 measures (i.e., with the sensor 316) the voltage, current, and/or power of the solar module 104 and determines the voltage and/or current waveform during the time period. The voltage of the solar module 104 is the voltage between the positive and negative terminals of the solar module 104. The current of the solar module 104 is the current flowing in the negative terminal and out of the positive terminal of the solar module 104. At method block 412, the MLPE 310 decodes (i.e., with the controller 318) the message by demodulating the voltage waveform and/or the current waveform of the solar module 104 during the time period.

At method block 414, the MLPE 310 responds to the message (or the lack of a message) received from the inverter 106. As discussed herein, if a "keep alive" signal is received, the MLPE 310 may continue to allow the solar module 104 to supply power to the inverter 106. If a "keep alive" message is not received, the MLPE 310 may disconnect the solar module 104 (i.e., by opening the controlled switch 314). Alternatively or additionally, the MLPE 310 may respond to receiving a "disconnect" message by disconnecting the solar module 104 (e.g., by opening the controlled switch 314) from the inverter 106. Further the MLPE 310 may adjust the operating voltage of the solar module, adjust the operating current of the solar module, adjust the operating power of the solar module, adjust a converter switching frequency of a DC-DC converter of the solar module, adjust a converter duty cycle of the DC-DC converter of the solar module, or initiate a global maximum power point search for the solar module.

Figure 5A:
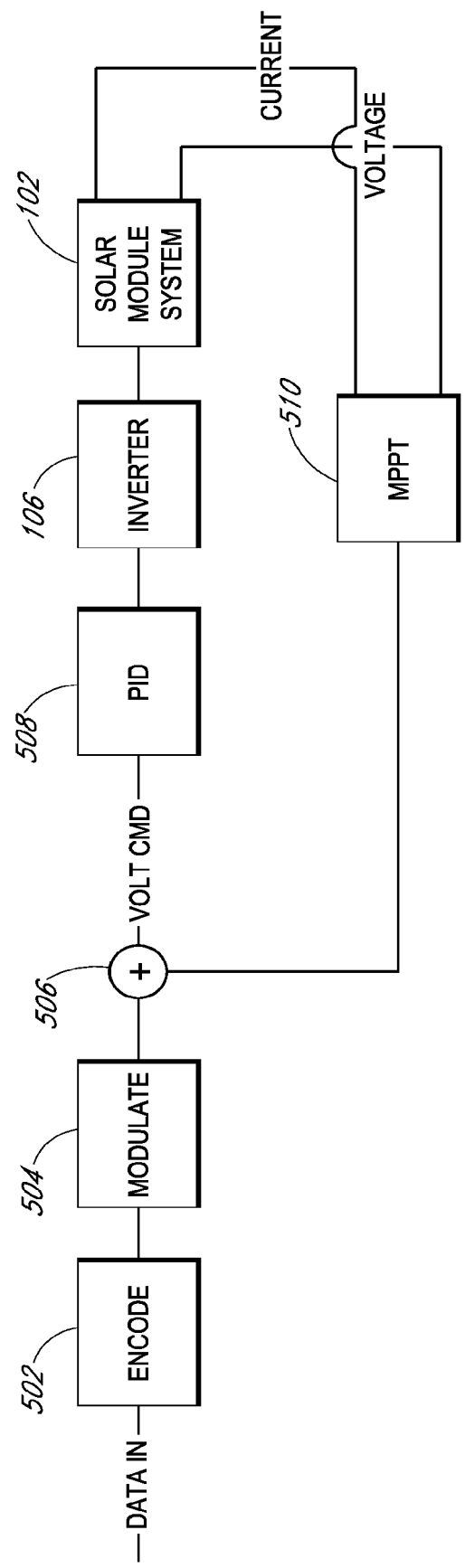
FIG. 5A is a simplified block diagram of at least one embodiment of a transfer function illustrating signal processing that may be performed by an inverter according to the present disclosure.

FIG. 5A is a block diagram of a transfer function illustrating the signal processing done by an inverter 106 encoding data (e.g., a message) on a MPPT algorithm. Each block represents actions taken by the inverter 106. Data to be encoded on the MPPT algorithm (e.g., a "keep alive" message, a "disconnect" message, other messages disclosed herein, etc.) is fed into an encoder 502. The encoder 502 may translate the message into a binary code (e.g., an 8 bit binary code). The modulator 504 may convert the binary code into a message waveform (e.g., a square wave). An adder 506 combines the message waveform with an MPPT signal from an MPPT module 510, resulting in a combined signal. The combined signal is received by a proportional-integral-derivative (PID) controller 508. The PID controller 508 converts the combined signal (containing an MPPT signal with a message modulated onto it) into discrete signals to the controlled switches 208 of the inverter 106. For example, the PID controller 508's output may send signals to the controlled switches 208 to adjust inverter 106's input voltage and/or current. Accordingly, the voltage and/or current of the solar module system 102 may in turn be adjusted as dictated by the inverter 106. As discussed herein, each solar module 104 of the solar module system 102 may monitor these changes in voltage and/or current to decode the message and respond accordingly. The MPPT module 510 monitors the voltage and/or current of the solar module system 102 (e.g., continuously, in a perturb and observe scheme) to determine how to adjust the input voltage and/or current of the inverter 106 (e.g., via the PID controller 508) to ensure that the solar module system 104 tracks its maximum power point and generates as much power as possible. As such, the modulated signal provides an AC MPPT perturbation, which the MPPT module 510 receives and adjust the DC operating point of the solar module system 104 accordingly.

The MPPT module 510 may utilize any suitable MPPT algorithm to track the maximum power point of the solar module system 104. For example, in the illustrative embodiment, the MPPT module 510 utilizes ripple correlation control (RCC) to optimize power production according to the below equation:

$$u(t) = k \int \frac{dP}{dt} \frac{dI}{dt} dt \text{ or } u(t) = k \int \frac{dP}{dt} \frac{dV}{dt} dt$$

It should be appreciated that ripple correlation control techniques correlate the time derivative of either voltage or current with the time derivative of power. In disclosed technologies, the voltage, current, and power are time varying due to the MPPT perturbation caused by the modulation of the message on the MPPT signal.

Figure 5B:
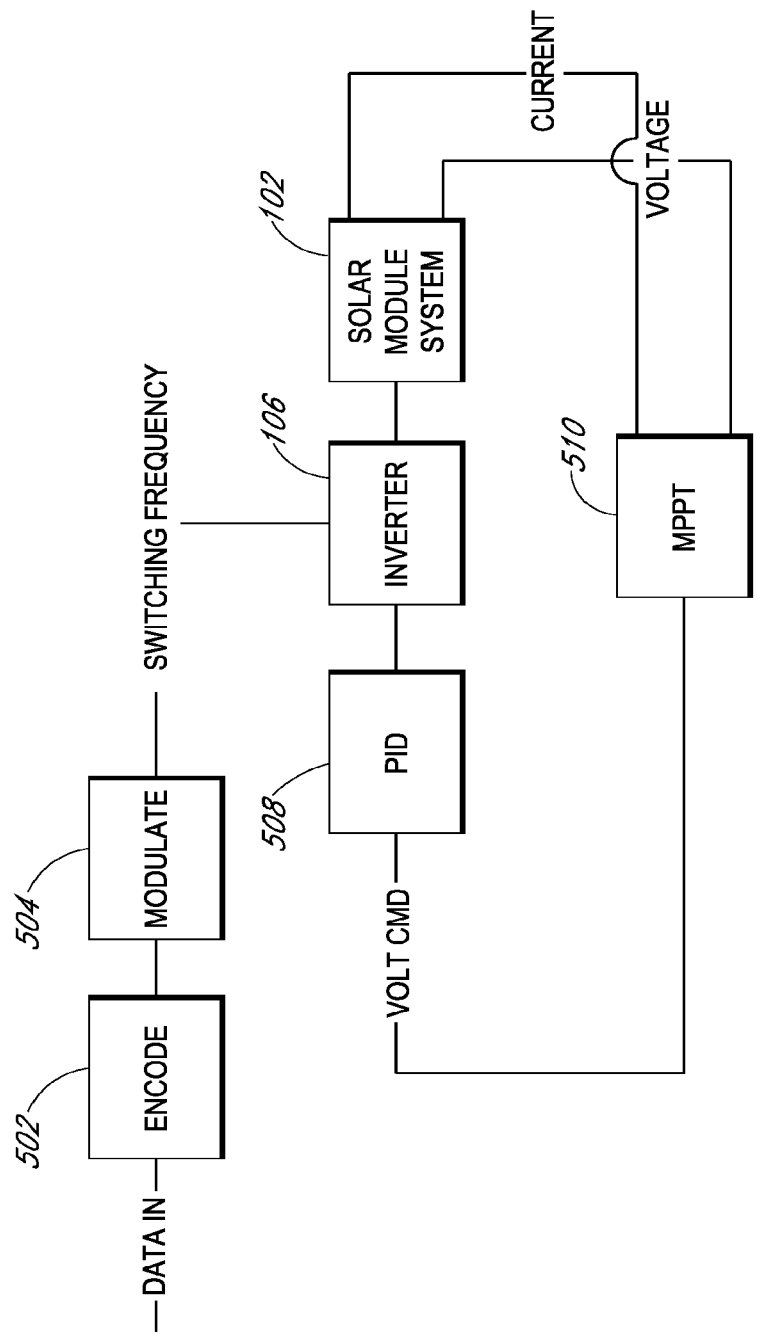
FIG. 5B is a simplified block diagram of at least one other embodiment of a transfer function illustrating signal processing that may be performed by an inverter according to the present disclosure.

FIG. 5B is a block diagram of a transfer function illustrating the signal processing done by an inverter 106 encoding data (e.g., a message) on the switching frequency of the controlled switches 208 of the inverter 106. Each block represents actions taken by the inverter 106. The inverter 106 implementing the transfer function shown in FIG. 5B is also performing MPPT algorithm. Accordingly, the inverter 106 performing the transfer function of FIG. 5B may implement many of the functions implemented by an inverter 106 performing the transfer function of FIG. 5A. Data to be encoded on the switching frequency of the controlled switches 106 (e.g., a "keep alive" message, a "disconnect" message, other messages disclosed herein, etc.) is fed into an encoder 502. The encoder 502 may translate the message into a binary code (e.g., an 8 bit binary code). The modulator 504 may convert the binary code into a message waveform (e.g., a square wave). The inverter 106 implementing the transfer function of FIG. 5B controls the switching frequency of its controlled switches 208 (other than, for example, allowing the switching frequency to fluctuate naturally based on variations from the AC grid or the load coupled to the inverter 106). The controlled switching frequency is substantially constant when the inverter 106 is not encoding messages, however the modulator 504 modulates the message waveform onto the switching frequency. In some embodiments, the modulator 504 may encode a "NULL" message that includes no information to be sent, but causes the inverter 106 to vary the switching frequency, which may allow the inverter 106 to "smear" its electromagnetic interference (EMI) signature. The inverter 106 controls the switching frequency of its controlled switches 208 (e.g., the high frequency controlled switches used in the DC-DC converters 202) using the modulated controlled switching frequency. The inverter 106 may also receive input from the PID module 508 and control the controlled switches 208 to adjust inverter 106's input voltage and/or current. Accordingly, the voltage and/or current of the solar module system 102 may in turn be adjusted as dictated by the inverter 106. As discussed herein, each solar module 104 of the solar module system 102 may monitor these changes in voltage and/or current to decode the message and respond accordingly. The MPPT module 510 monitors the voltage and/or current of the solar module system 102 (e.g., continuously, in a perturb and observe scheme) to determine how to adjust the input voltage and/or current of the inverter 106 (e.g., via the PID controller 508) to ensure that the solar module system 104 tracks its maximum power point and generates as much power as possible.

Figure 6:
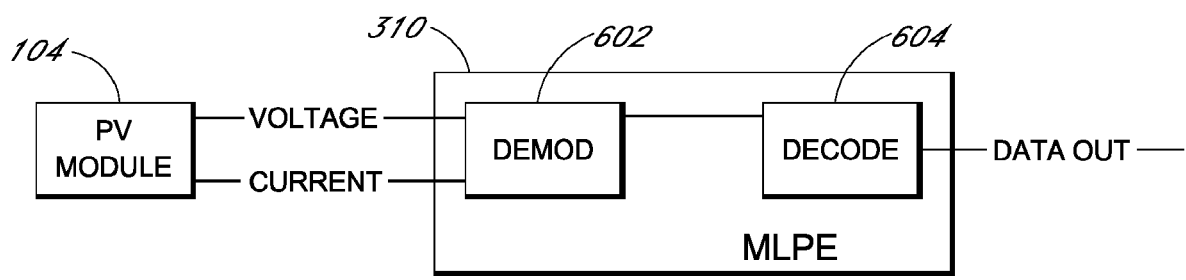
FIG. 6 is a simplified block diagram of at least one embodiment of a transfer function illustrating signal processing that may be performed by a solar module according to the present disclosure.

FIG. 6 is a block diagram of a transfer function illustrating the signal processing done by a solar module receiving and decoding data (e.g., a message) sent by the inverter 106 (e.g., modulated on the MPPT signal, modulated on the switching frequency of the controlled switches 208). As discussed herein, the inverter 106 controls the voltage and/or current of the solar module 104 over a time period by adjusting the operational parameters of the inverter 106 during the time period. The MLPE 310 monitors the voltage and/or current waveforms of the solar module 104 over the time period. A demodulator 602 may demodulate (e.g, FSK, PSK, QAM, etc.) the message waveform from the voltage and/or current waveforms. A decoder 604 may analyze the message waveform to determine a bitstream and determine whether the bitstream represents a message (e.g., a "keep alive" message, etc.). Demodulation and decoding process may use error correction to eliminate false receptions of messages.

The message (or an indicator that there is no encoded message) may be outputted from the transfer function (e.g., to the controller 318), and the controller 318 may alter the function of the solar module 104 (e.g., by disconnecting the solar module 104, by adjusting the voltage of the solar module 104, etc.) as a result of the message (or lack of a message).

Figure 7:
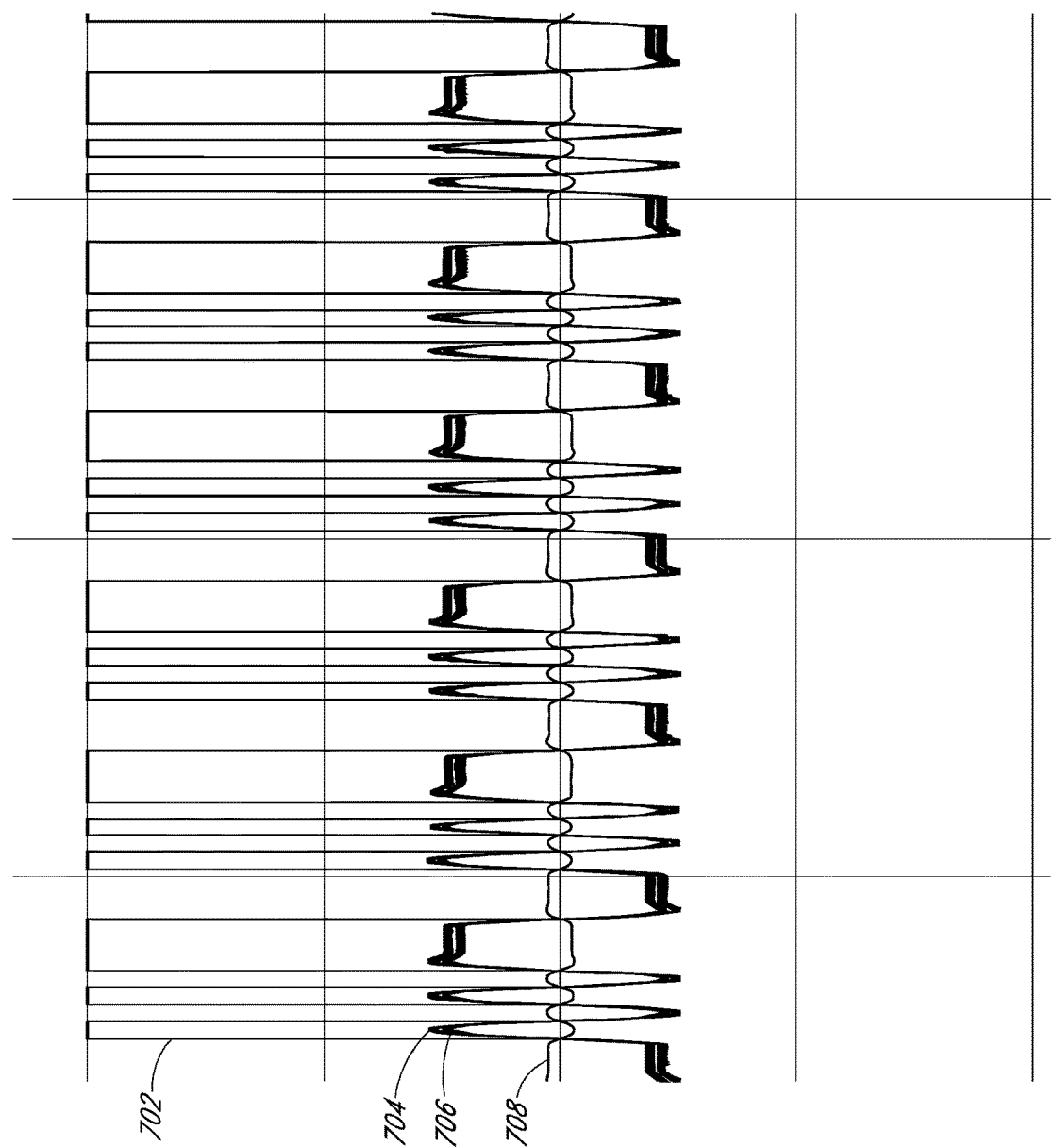
FIG. 7 is an illustrative screenshot of an oscilloscope illustrating a message being encoded on a maximum power point tracking signal of an inverter according to the present disclosure.

Referring now to FIG. 7, a screenshot of an oscilloscope showing a message being encoded on an MDPT RCC signal is shown. A message waveform 702 (e.g., as would be output from a modulator 504 in FIGS. 5A and 5B) is a square wave including a series of high voltages and low voltages representing the bit stream of a message. For example, the message waveform 702 reads "10101100" repeated four times. Waveform 704 is a representation of the voltage control parameter of the inverter 106 changing over a period of time being used as a carrier wave with the message waveform 702 modulated onto the waveform 704. As discussed herein, the voltage across and current through the solar module system 102 (and therefore each solar module 104 in the solar module system 102) is set by the voltage control parameter. Waveform 706 is a representation of the voltage across the solar module system 102 as controlled by the inverter 106. Waveform 708 is a representation of the current through the solar module system 102 occurring as a result of the changing voltage. It will be understood from examining FIG. 7, the "10101100" message can be seen in the waveform 706 and in the waveform 708 (but 180 degrees out of phase). Accordingly, the message may be transmitted from the inverter 106 to the solar module system 104 by the inverter adjusting its voltage control parameters.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for operating a solar module coupled to an inverter, the method comprising:
   supplying electrical power from the solar module to the inverter during a first time period;
   monitoring, during the first time period, one or more of the voltage of the solar module or the current of the solar module to determine one or more of a first voltage waveform or a first current waveform of the solar module during the first time period;
   determining, during the first time period, whether a first message was encoded by the inverter in the one or more of the first voltage waveform or first current waveform of the solar module; and
   performing one or more actions based on the determination of whether the first message was encoded, the one or more actions including initiating a global maximum power point search for the solar module.

2. The method of claim 1 wherein the one or more actions include:
   if the first message was not encoded in the one or more of the first voltage waveform and first current waveform of the solar module, ceasing to supply electrical power to the inverter with the solar module; and
   if the first message was encoded in the one or more of the first voltage waveform or first current waveform of the solar module, continuing to supply electrical power to the inverter from the solar module.

3. The method of claim 2 wherein the solar module includes a controlled switch and ceasing to supply electrical power to the inverter with the solar module includes electrically disconnecting the solar module from the inverter by opening the controlled switch.

4. The method of claim 1 further comprising:
   determining whether a second message was encoded in the one or more of the first voltage waveform or first current waveform of the solar module; and
   if the second message was encoded in the one or more of the first voltage waveform and first current waveform of the solar module, ceasing to supply electrical power to the inverter from the solar module.

5. The method of claim 1 wherein the one or more actions include one or more of adjusting the operating voltage of the solar module, adjusting the operating current of the solar module, adjusting the operating power of the solar module, and adjusting a converter switching frequency of a DC-DC converter of the solar module, adjusting a converter duty cycle of the DC-DC converter of the solar module.

6. The method of claim 1 wherein determining whether a first message was encoded in the one or more of the first voltage waveform or first current waveform includes demodulating the one of more of the first voltage waveform or first current waveform.

7. The method of claim 1 wherein supplying electrical power to the inverter from the solar module during the first time period includes supplying electrical power at a voltage set by the inverter during the first time period.

8. The method of claim 1 wherein supplying electrical power to the inverter from the solar module during the first time period includes supplying electrical power at a current and/or voltage set by the inverter during the first time period.

9. A method for operating a solar power system having an array of solar modules and an inverter, the method comprising:
   generating electricity by and from the array of solar modules, wherein the electricity being generated by and from the array of solar modules has a voltage waveform and a current waveform;
   receiving, at the inverter, electricity being generated by the array of solar modules during a first time period of continuing electricity generation by the array of solar modules; and
   controlling with the inverter one or more of the voltage waveform or current waveform of the solar modules during the first time period,
      wherein controlling with the inverter one or more of the voltage waveform or current waveform of the solar modules includes using modulation of the inverter to encode a first message on to one or more of the voltage waveform or the current waveform of the electricity being generated by and from the array of solar modules, the first message encoded to initiate a global maximum power point search for the solar module.

10. The method of claim 9 further comprising:
determining to shut down the array of solar modules;
as a result of determining to shut down the array of the solar modules, not encoding the first message on the one or more of the voltage waveform and the current waveform of the solar modules during a second time period;
not receiving at the inverter electricity generated by the array of solar modules during the second time period.

11. The method of claim 9 further comprising:
as a result of determining to shut down array of the solar modules, encoding a second message on the one or more of the voltage waveform or the current waveform of the solar modules during a second time period, wherein the second message is a command to the solar modules to shut down.

12. The method of claim 9 wherein the first message comprises a message to the solar modules to adjust the operating voltage of the solar module, adjust the operating current of the solar module, adjust the operating power of the solar module, adjust a converter switching frequency of a DC-DC converter of the solar module, adjust a converter duty cycle of the DC-DC converter of the solar module or a combination thereof.

13. The method of claim 9 wherein the inverter includes a plurality of controlled switches, and wherein controlling with the inverter one or more of the voltage waveform or current waveform of the solar modules during the first time period includes adjusting the switching frequency of the controlled switches.

14. The method of claim 9 wherein controlling with the inverter one or more of the voltage waveform and current waveform of the solar modules during the first time period includes performing maximum power point tracking (MPPT) on the solar modules.

15. The method of claim 14 wherein performing MPPT includes one or more of performing ripple correlation control or extremum seeking control.

16. A method for operating a solar power system having an array of solar modules and an inverter, the method comprising:
generating electricity by and from the array of solar modules, wherein the electricity being generated by and from the array of solar modules has a voltage waveform and a current waveform;
receiving, at the inverter, electricity being generated by and from the array of solar modules during a first time period of continuing electricity generation by the array of solar modules; and
controlling with the inverter one or more of the voltage waveform or current waveform of electricity being generated by and from the solar modules during the first time period,
wherein controlling with the inverter one or more of the voltage waveform or current waveform of electricity being generated by and from the solar modules includes using modulation of the inverter to encode a first message on to one or more of the voltage waveform or the current waveform of electricity being generated by and from the solar modules, and
wherein controlling with the inverter one or more of the voltage waveform or current waveform of electricity being generated by and from of the solar modules also includes receiving the first message at a sensor and decoding the first message at a controller, the first message encoded to initiate a global maximum power point search for the solar module.

17. The method of claim 16 further comprising:
determining, at the array of solar modules, to shut down the array of solar modules;
as a result of determining to shut down the array of the solar modules, not encoding the first message on the one or more of the voltage waveform and the current waveform of the solar modules during a second time period;
not receiving at the inverter electricity generated by the array of solar modules during the second time period.

18. The method of claim 16 further comprising:
as a result of determining to shut down array of the solar modules, encoding at the inverter a second message on the one or more of the voltage waveform or the current waveform of the solar modules during a second time period, wherein the second message is a command to the solar modules to shut down.

19. The method of claim 16 wherein the first message comprises a message to the solar modules to adjust the operating voltage of the solar module, adjust the operating current of the solar module, adjust the operating power of the solar module, adjust a converter switching frequency of a DC-DC converter of the solar module, adjust a converter duty cycle of the DC-DC converter of the solar module, or a combination thereof.

20. The method of claim 16 wherein the inverter includes a plurality of controlled switches, and wherein controlling with the inverter one or more of the voltage waveform or current waveform of the solar modules during the first time period includes adjusting the switching frequency of the controlled switches, and wherein each of the solar modules of the array of solar modules includes a module level power electronic (MLPE).

* * * * *